No. 715,310. Patented Dec. 9, 1902.
M. VAN B. SMITH.
GAS PRODUCER.
(Application filed Nov. 23, 1898.)

(No Model.) 4 Sheets—Sheet 1.

WITNESSES: INVENTOR

No. 715,310. Patented Dec. 9, 1902.
M. VAN B. SMITH.
GAS PRODUCER.
(Application filed Nov. 23, 1898.)

(No Model.) 4 Sheets—Sheet 2.

WITNESSES: INVENTOR

No. 715,310. Patented Dec. 9, 1902.
M. VAN B. SMITH.
GAS PRODUCER.
(Application filed Nov. 23, 1898.)

(No Model.) 4 Sheets—Sheet 3.

WITNESSES: INVENTOR

No. 715,310. Patented Dec. 9, 1902.
M. VAN B. SMITH.
GAS PRODUCER.
(Application filed Nov. 23, 1898.)
(No Model.) 4 Sheets—Sheet 4.

WITNESSES: INVENTOR

UNITED STATES PATENT OFFICE.

MARTIN VAN BUREN SMITH, OF PHILADELPHIA, PENNSYLVANIA, ASSIGNOR, BY MESNE ASSIGNMENTS, TO THE AMERICAN STOKER COMPANY, A CORPORATION OF NEW YORK.

GAS-PRODUCER.

SPECIFICATION forming part of Letters Patent No. 715,310, dated December 9, 1902.

Application filed November 23, 1898. Serial No. 697,235. (No model.)

*To all whom it may concern:*

Be it known that I, MARTIN VAN BUREN SMITH, a citizen of the United States, and a resident of Philadelphia, in the county of Philadelphia and State of Pennsylvania, have invented certain new and useful Improvements in Gas-Producers, of which the following is a specification.

My present invention relates to improvements in gas-producers; and it consists of certain novel parts pointed out in the concluding claims.

In the accompanying drawings I have shown my invention applied in forms which are at present preferred by me; but it will be understood that various modifications and changes in the apparatus may be made without departing from the spirit of my invention and without exceeding the scope of the concluding claims and that with respect to the methods of making such gas these are not dependent in any respect upon the mechanism shown or, indeed, upon the use of any specified mechanism.

Figures 1, 2:
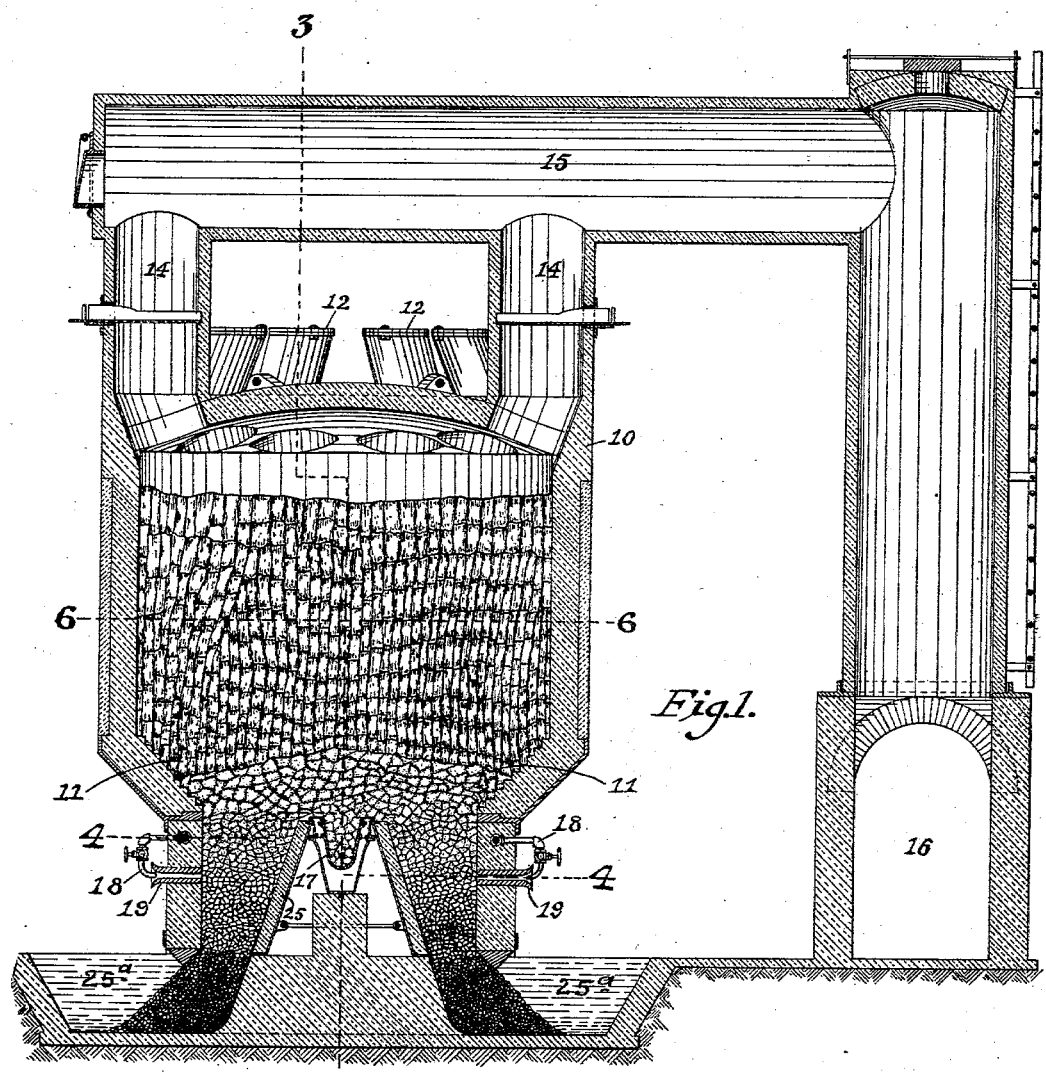
Figure 3:
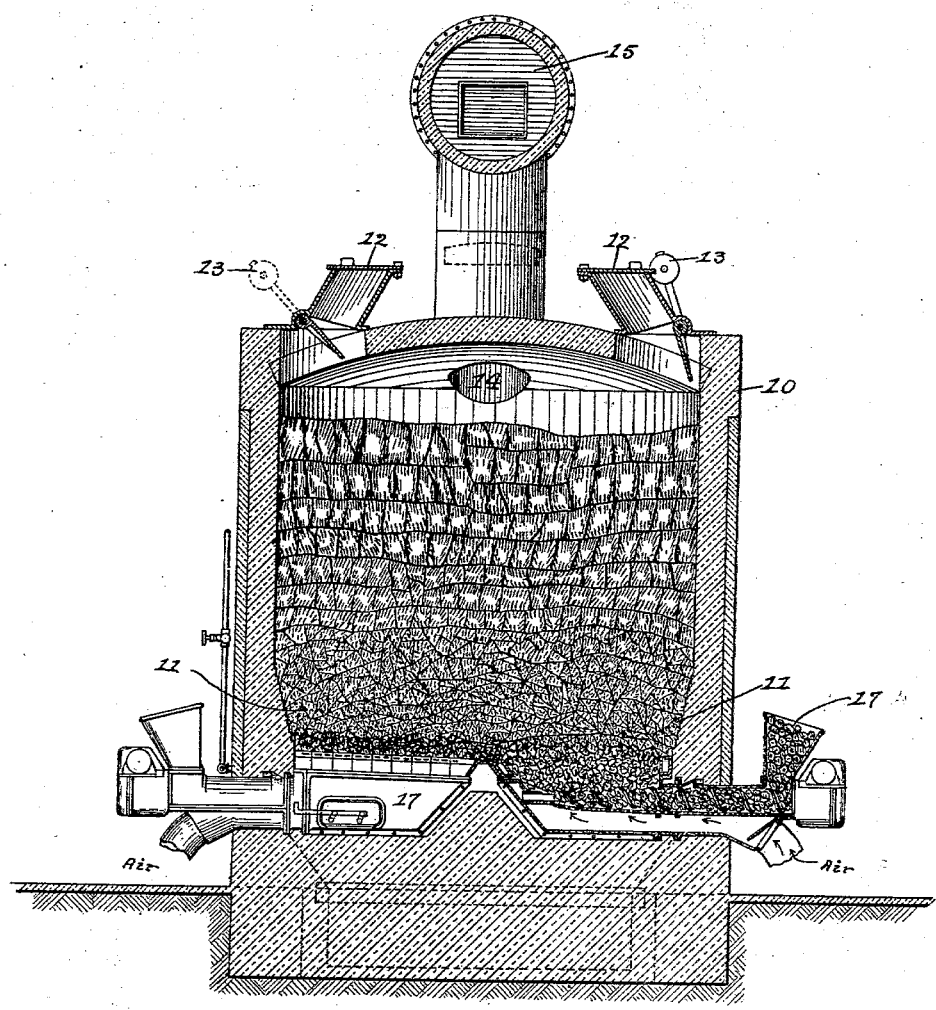
Figure 4:
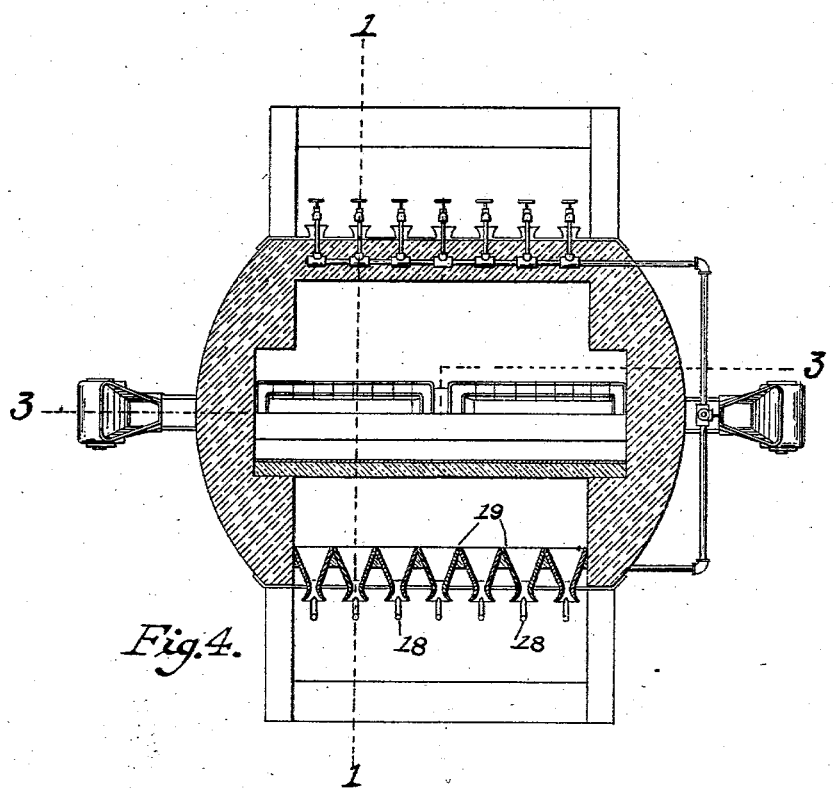
Figure 5:
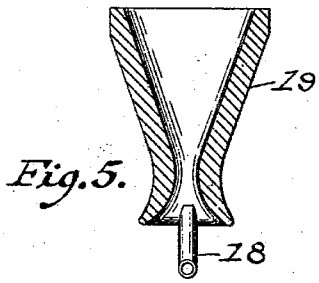
Figure 7:
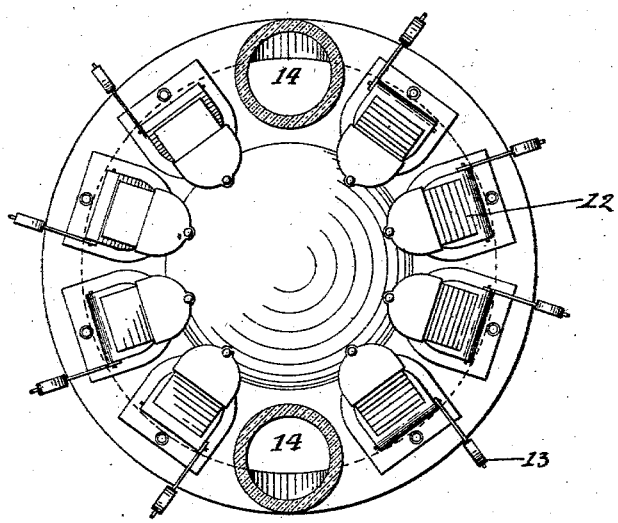
Figure 6:
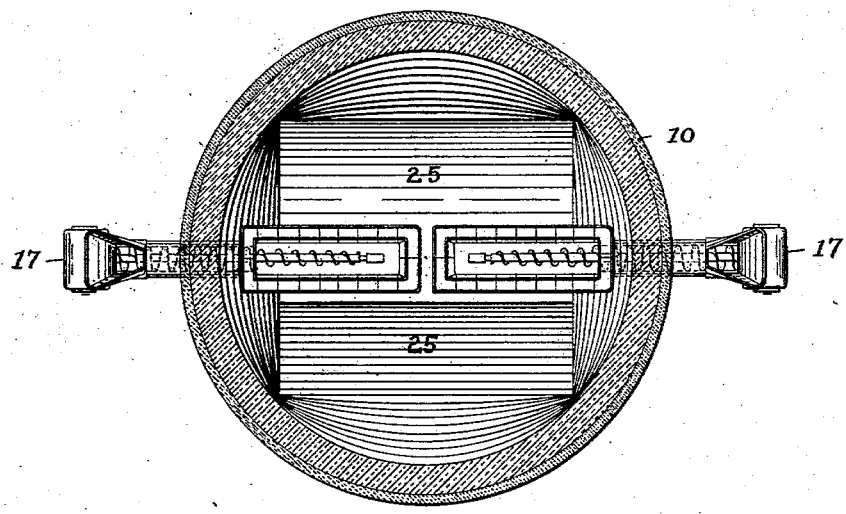

In the accompanying drawings, Figure 1 is a cross-section through a gas-generator involving my invention, the same being on the line 1 1, Fig. 4. Fig. 3 is a longitudinal section through the same on the line 3 3, Figs. 1 and 4. Fig. 2 is a cross-section through the underfeed-stoker, showing the same in enlarged view and in detail. Fig. 4 is a cross-section on the line 4 4, Fig. 1. Fig. 5 is an enlarged detail of one of the nozzles through which air and steam are introduced, series of which are shown in Fig. 4. Fig. 6 is a section through the generator on the line 6 6, Fig. 1. Fig. 7 is a top view of the said generator.

Up to the present time it has been, as far as I know, the universal practice in generators of producer-gas to apply the fresh coal on top of the incandescent coke, the result being that the gases produced are charged with the water expelled from the green coal and under certain conditions with vaporized liquid hydrocarbons, such as tar. These form unstable gases, which it is the common practice to remove when a stable gas is needed.

One of the principal features of my present invention consists in reversing this practice by the introduction of the green fuel below the incandescent body of coke instead of above it. The result of this change is marked. In the first place the water expelled from the green fuel in passing up through the incandescent body of coke is converted into hydrogen and carbonic-oxid gases, which are stable. In the second place the liquid hydrocarbons are oxidized and also converted into hydrogen and carbonic-oxid gases. In the third place, since the distillation of the hydrocarbons takes place in a zone in which free oxygen is present they are decomposed and converted into carbonic-acid gas, which in its passage through the incandescent coke on its way to the exit-flue is converted into carbonic-oxid gas in precisely the same way that the carbonic-acid gas resulting from the combustion of the coke is on its way to the flue converted into carbonic-oxid gas. As a result the gas produced is more nearly pure carbonic-oxid and hydrogen gases, free from moisture and volatilized liquid hydrocarbons, and therefore a stable gas generated as such and not made stable by any subsequent process, such as washing or scrubbing or draining off of the non-stable and deposited constituents. Various difficulties arising from the unstability of producer-gas as now made are therefore avoided, and a gas which is suitable for general heating purposes is produced. In the manufacture of such gas I prefer to introduce steam, as it is the common practice to do in the manufacture of producer-gas, to supplement the combustible gases produced.

The following is a description of the structure shown in the accompanying drawings.

10 represents the walls of the furnace, which are contracted at 11.

12 represents suitable hoppers arranged on top of the furnace, through which the initial charge of fuel is introduced. These hoppers are provided with weighted doors 13.

14 14 are the uptakes leading to the gas-main 15.

16 is a conduit leading to a regenerative furnace or other device for utilizing the gas produced in the generator.

17 17 are devices for introducing the fuel under the bed of incandescent coke contained in the generator-chamber. These devices are shown as a well-known form of under-feed-stoker, in which the coal is fed from the hopper by means of an Archimedes screw, and is by said screw elevated into the gas-generating chamber.

18 18 are steam-pipes, and 19 19 are air-openings, the parts being assembled and arranged so that the issuing steam forces into the lower part of the generating-chamber commingled air and steam.

The underfeed-stoker is shown in detail in Fig. 2, in which 20 is the Archimedes screw; 21, the coal-reservoir; 22, an air-chamber provided with a forced draft. 23 23 are twyer-blocks, and 24 24 are openings from which air is ejected. These stokers, as shown in Fig. 3, may be arranged end to end and placed at or near the pinnacle of a central abutment 25, located so as to discharge the green fuel above the point where the air and steam enter through the nozzles 18 19.

25ᵃ 25ᵃ are water-sealed ash-pits into which the incombustible ash or residue descends.

The operation of the device shown in the drawings may thus be described: Through the hoppers 12 12, on starting the generator, kindlings are first introduced, and on top of them coke is introduced to the desired depth. The fire being lighted and the coke brought to the required condition of incandescence, the stokers are started and green coal is continuously fed into the generator under the incandescent coke. This fuel as it is fed upward is converted into coke by the distillation of its hydrocarbon constituents, (solid and liquid,) which, in the presence of the air issuing through the twyer-openings, are decomposed, forming carbonic-acid gas (which, passing upward through the incandescent body of coke above it, is converted into carbonic-oxid gas before it leaves the generator) and hydrogen. The water contained in the coal is, like the steam introduced through the nozzle 18, decomposed, producing hydrogen gas. The fresh coke overflows from the stoker and passes down at the sides of the abutment on which it is located, where it meets the incoming air and steam introduced through the nozzles 18 19. In the presence of the free oxygen (and, perhaps, aided by the oxygen of the steam) combustion of the coke ensues and carbonic-acid gas is produced, which, passing upward through the incandescent body of coke above it, is converted into carbonic-oxid gas. The hydrogen which results from the decomposition of the steam passes up through the incandescent coke unchanged. As a result a new industrial gas is formed which differs from ordinary producer-gas in that it is practically free from water, tar, and other unstable constituents and in which a portion at least of the hydrocarbon has been converted into carbonic-oxid gas by combustion and subsequent carbonization, it being understood that carbonic acid in its passage through the incandescent body of coke takes up carbon and is converted into carbonic-oxid gas.

It will of course be understood that in the practice of my process any means whereby the green fuel is introduced under the incandescent body of coke may be employed and that, furthermore, my invention in its broader aspects is not limited to the use of a stoker of the construction shown or of any particular construction, the advantage of this feature of the apparatus described being that a continuous and uniform feed of fuel is assured with the minimum labor. Although I now prefer to use separate nozzles 18 19 for the introduction of air and steam to effect the combustion of the coke, the passages through the twyers of the stoker may be relied upon for the introduction of all the atmospheric air required in the operation, and in addition steam may be introduced by way of these openings. In any event the introduction of steam may be omitted altogether, although it is universally recognized as good practice to introduce so much steam as can be decomposed without reducing the temperature within the generator below the required point.

When I speak of the incandescent body of coke being above the freshly-introduced fuel, it will be understood that the same result would be attained if the coal were introduced above the coke and the exit-pipe were below it. In other words, the incandescent coke is to intervene between the freshly-introduced fuel and the exit-pipe from the generator.

Instead of distilling the hydrocarbons in the presence of free oxygen or commingling them with free oxygen before they leave the generator or retort, thus causing combustion, the coal might be introduced above the zone of free oxygen, where combustion would not take place. In the apparatus shown in the drawings this might, for example, be done by omitting the air-openings 24 24 in the twyer-blocks. The resulting gas in this case would contain a larger proportion of hydrocarbon gas; but the water in the coal would still be converted into hydrogen gas during its passage through the incandescent coke.

Having thus described my invention, what I claim, and desire to secure by Letters Patent, is—

1. In a gas-producer, the combination of a chamber constructed to contain a body of incandescent coke, an underfeed-stoker mounted in the lower end of said chamber for feeding green fuel upwardly therein for replenishing the coke as the latter becomes consumed, a refuse-discharging leg at the side of said stoker through which ash resulting from the combustion may be continuously discharged, and means for supplying air to said chamber adjacent to the combustion zone of the green fuel, substantially as and for the purposes set forth.

2. In a gas-producer, the combination of a chamber constructed to contain a body of incandescent coke, an underfeed-stoker mounted in the lower end of said chamber for feeding green fuel upwardly therein for replenishing the coke as the latter becomes consumed, a refuse-discharging leg at the side of said stoker through which ash resulting from the combustion may be continuously discharged, means for supplying air to said chamber adjacent to the combustion zone of the green fuel, and a water seal at the lower end of said leg, substantially as and for the purposes set forth.

3. In a gas-producer, the combination of a chamber constructed to receive green fuel in its lower zone and to contain above the green fuel the incandescent coke resulting from the ignition of the former, a prismatic abutment in the bottom of the chamber forming on each side thereof a refuse-discharging leg for continuously discharging the ash resulting from the combustion, an underfeed-stoker mounted in said abutment for feeding upwardly the green fuel introduced into the chamber, and a water seal at the bottom of each of said legs, substantially as and for the purposes set forth.

4. A gas-generator having a gas-delivering opening at one end and blast-twyers at the other, in combination with a fuel-feeding device located between the twyers and the gas-exit, and auxiliary twyers discharging into the fuel adjacent to its supply-point, substantially as and for the purposes set forth.

5. A gas-generator having a gas-delivering opening at one end and blast-twyers at the other, in combination with a fuel-feeding device extending across the generator between said twyers and the gas-exit and discharging fuel in the direction of the flow of the blast, and auxiliary twyers associated with the fuel-feeding device, substantially as and for the purposes set forth.

6. In a gas-generator, the combination with a chamber adapted to contain incandescent coke, of an underfeed-stoker arranged below the body of said coke and adapted to introduce therein fresh fuel, said chamber having downwardly-extending refuse-discharging legs at the side of the stoker provided with a water seal, and means substantially as described for introducing steam into said legs below the level of the said stoker.

7. In a gas-generator the combination of a chamber or retort provided with means for introducing the fuel thereto from below and below the air-supply, said retort having downwardly-extending refuse-discharging legs at the side of the fuel-feed, means for discharging air and steam into said legs, and a gas-conveying pipe leading from the upper end of the retort.

8. In a gas-generator, the combination with a chamber adapted to contain incandescent coke, of an underfeed-stoker arranged below the body of said coke, and adapted to introduce therein fresh fuel, said chamber having downwardly-extending refuse-discharging legs at the side of the stoker provided with a water seal, and means, substantially as described, for introducing atmospheric air and steam into said legs below the level of said stoker.

MARTIN VAN BUREN SMITH.

Witnesses:
J. EDGAR BULL,
CHAS. E. ANDERSON.